(12) United States Patent
Kaneda et al.

(10) Patent No.: US 6,655,623 B2
(45) Date of Patent: Dec. 2, 2003

(54) LEADER TAPE AND TAPE CARTRIDGE

(75) Inventors: Hiroshi Kaneda, Tokyo (JP); Cyoutarou Kouzu, Tokyo (JP); Kenji Kotegawa, Tokyo (JP); Shintaro Shinkawa, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/128,304

(22) Filed: Apr. 24, 2002

(65) Prior Publication Data

US 2002/0162911 A1 Nov. 7, 2002

(30) Foreign Application Priority Data

Apr. 26, 2001 (JP) ........................ 2001-128518

(51) Int. Cl.$^7$ .................... G11B 15/66; B32B 31/20
(52) U.S. Cl. ................ 242/332.4; 242/348.2; 156/73.4; 156/580.2
(58) Field of Search .................. 242/332.4, 332.7, 242/348.2; 360/132; 156/73.1, 73.4, 290, 308.2, 308.4, 580.2

(56) References Cited

U.S. PATENT DOCUMENTS

| | | | | |
|---|---|---|---|---|
| 5,746,856 A | * | 5/1998 | Hendershot et al. | 156/73.4 |
| 5,971,310 A | * | 10/1999 | Saliba et al. | 242/332.4 |
| 6,375,108 B1 | * | 4/2002 | Drechsler et al. | 242/332.4 |
| 6,450,432 B1 | * | 9/2002 | Kaneda et al. | 242/332.4 |
| 6,502,776 B2 | * | 1/2003 | Sogabe et al. | 242/332.4 |
| 6,596,109 B2 | * | 7/2003 | Posa et al. | 156/290 |

FOREIGN PATENT DOCUMENTS

JP 2001357657 12/2001

OTHER PUBLICATIONS

English Language Abstract of JP 2001–357657. Dec. 2001.

\* cited by examiner

*Primary Examiner*—William A. Rivera
(74) *Attorney, Agent, or Firm*—Greenblum & Bernstein, P.L.C.

(57) ABSTRACT

There is provided a leader tape which is capable of preventing breakage of a tape body when the tape body is pulled out, and a tape cartridge incorporating the leader tape. A leader tape includes a tape body having one end fixed to a tape, for enabling the tape to be pulled out of a cartridge body, and a pin attached to the tape body, for pulling out the tape therewith. The tape body has a portion on a side of another end opposite to the one end, the portion being folded such that the folded portion surrounds the periphery of the pin and that the folded portion has a leading end portion thereof welded to a tape surface of the tape body opposed to the folded portion. The welding is effected non-densely in at least one of a pin-side boundary portion of a welded area where the leading end portion and the tape surface opposed thereto are welded to each other and a one end-side boundary portion of the welded area.

10 Claims, 9 Drawing Sheets

LEADER TAPE AND TAPE CARTRIDGE

BACKGROUND OF THE INVENTION

1. Field of the Invention

This invention relates to a leader tape fixedly attached to a leading end of a tape, such as a magnetic tape for data recording and a cleaning tape for head cleaning, for enabling the tape to be pulled out of a cartridge body, and a tape cartridge incorporating the leader tape.

2. Description of the Related Art

Figure 11:
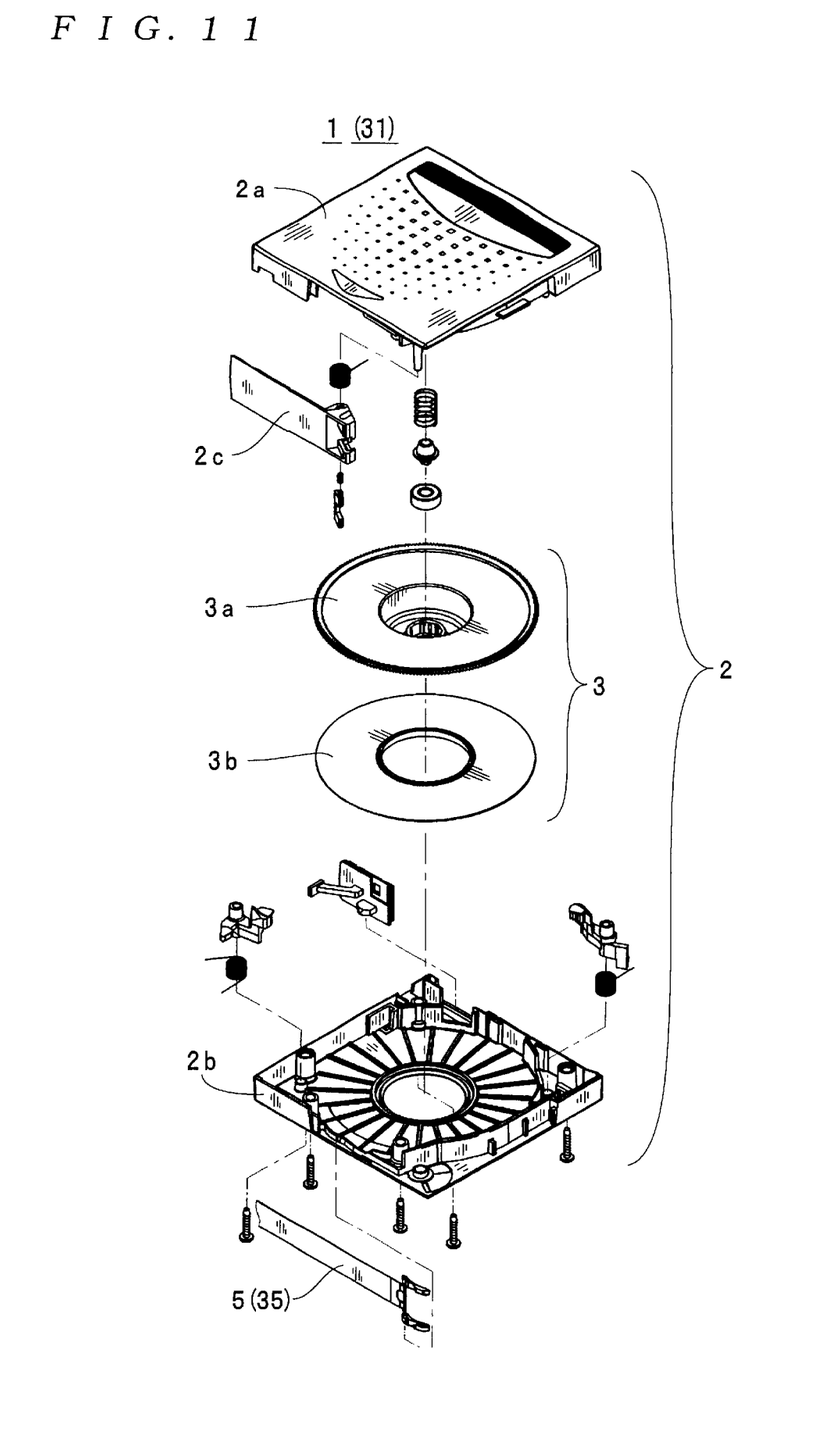
FIG. 11 is an exploded perspective view of a tape cartridge 1 (and a conventional tape cartridge 31)
Figure 12A:
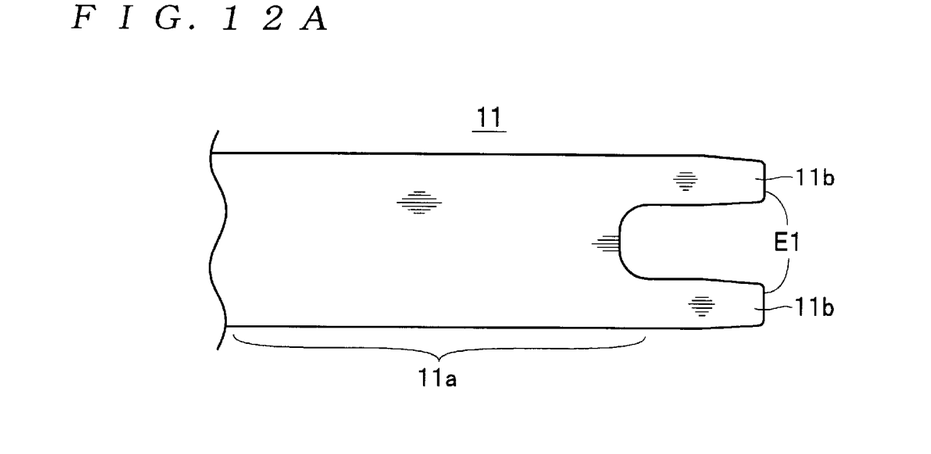
FIG. 12A is a plan view of a tape body 11.
Figure 12B:
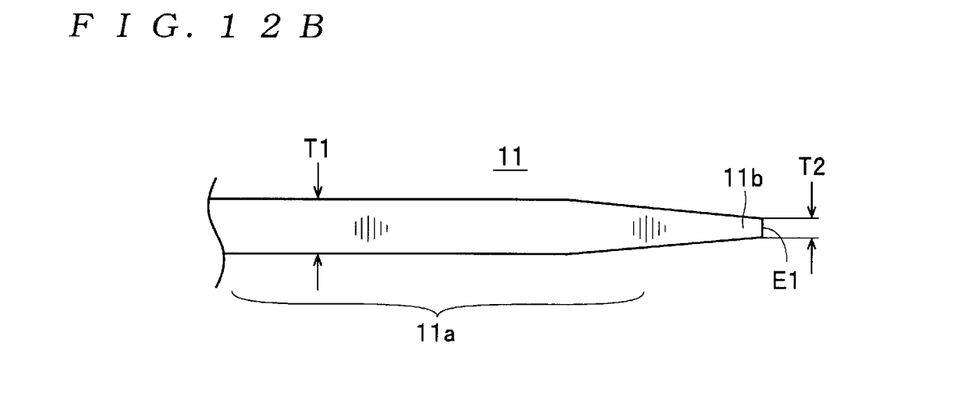
FIG. 12B is a side view of the tape body 11.
Figure 13:
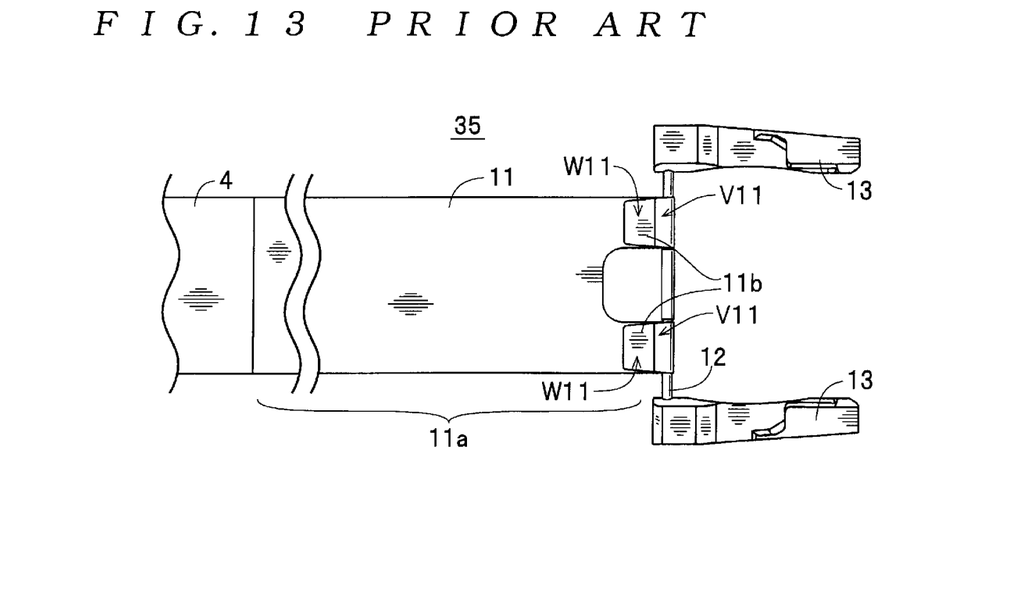
FIG. 13 is a plan view of the conventional leader tape 35.
Figure 15:
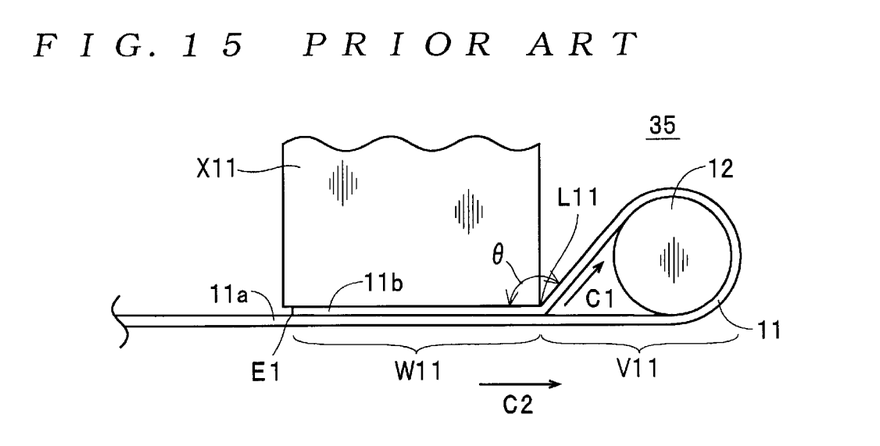
FIG. 15 is a side view of a portion of the leader tape 35 along the length of the leader tape 35 where a leading portion 11b is welded to a root portion 11a by a horn X11.

As the tape cartridge of the above-mentioned kind, which incorporates a leader tape, a tape cartridge 31 shown in FIG. 11 has been conventionally proposed. The tape cartridge 31 is a one reel-type recording medium cartridge, and is comprised of a cartridge body 2 having an upper half 2a, a lower half 2b, and a lid 2c, a single reel 3, and a magnetic tape 4 (see FIG. 13) for data recording wound around the reel 3 and accommodated in the cartridge body 2. A leader tape 35 is fixedly attached to the magnetic tape 4, for enabling the tape 4 to be pulled out of the cartridge body 3 by a record/playback device, not shown. As shown in FIGS. 12A, 12B and 13, this leader tape 35 is comprised of a tape body 11 having one end thereof fixedly attached to the magnetic tape 4, a pin 12 attached to the other end of the tape body 11, and engaging hooks 13, 13 fixed to respective opposite ends of the pin 12. As shown in FIG. 15, the tape body 11 has the other end folded such that it surrounds the periphery of the pin 12, and leading end portions 11b of the other end folded are welded to an opposed tape surface of a root portion 11a (see FIG. 13) of the tape body 11 between the one end fixed to the magnetic tape 4 and the folded portion.

Figure 14:
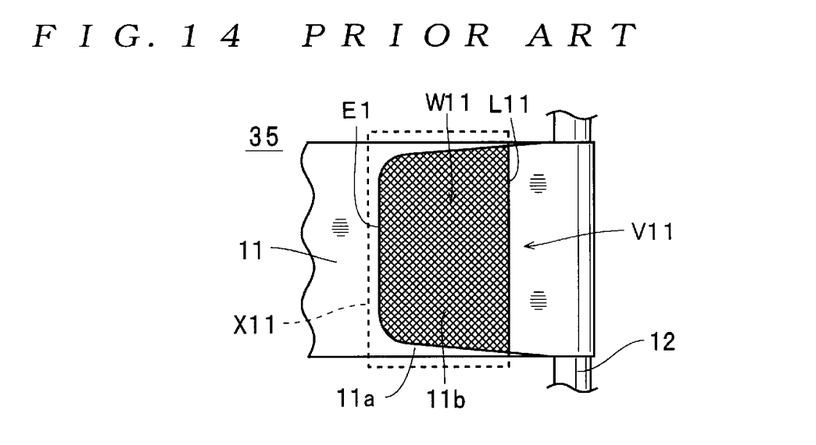
FIG. 14 is a plan view of a welded area W11 and its vicinity of the leader tape 35.

In making the leader tape 35, the leading end portions 11b are welded to the root portion 11a by respective horns X11 for ultrasonic welding. More specifically, first, the leading end portions 11b of the tape body 11 are folded such that they surround the periphery of the pin 12, and brought into contact with the root portion 11a. Then, as shown in FIG. 15, the horns X11 each having a prism shape are brought into contact with the respective surfaces of the leading end portions 11b, and ultrasonic waves are delivered from the horns X11 with the leading end portions 11b being urged against the root portion 11a. Each horn X11 has knurls formed on a welding surface (abutment surface via which the horn X11 abuts on the corresponding leading end portion 11b) thereof at a pitch of about 0.6 mm. Therefore, the leading end portions 11b and the root portion 11a are brought into firm contact with each other at the top of each knurl, and are progressively melted and mixed, starting with portions in such a firm contact with each. The portions melted to each other (melted portion) progressively spread until adjacent melted portions overlap each other to cause an area of each leading end portion 11b urged by the corresponding horn X11 and an area at the root portion 11a in contact with the urged area (welded area W11 in FIG. 15) to be entirely welded and mixed to each other. Then, the melted and mixed portions solidify when they cool to normal temperature. This causes each leading end portion 11b and the root portion 11a to be integrated with each other in the respective above-mentioned areas (welded area W11 in FIG. 15), whereby the attachment of the pin 12 to the tape body 11 is completed. In forming the leader tape 35, as described above, the horns X11 having a prism shape are used for welding. Therefore, as shown in FIG. 14, each welded area W11 where each leading end portion 11b and the root portion 11a are welded to each other and a corresponding non-welded portion V11 where the leading end portion 11b and the root portion 11a become apart from each other are divided by a boundary line L11 in the form of a straight line perpendicular to the direction of the length of the tape body 11. Further, the welding surface of the horn X11 has a size which extends beyond an edge E1 of the tape body 11, and hence the leading end portion 11b and the root portion 11a are welded to each other all over the area between the boundary line L11 and the edge E1. This process completes the leader tape 35. After this, the leader tape 35 is fixedly attached to the leading end of the magnetic tape 4, the magnetic tape 4 is wound around the reel 3, and then the resulting assembly is received in the cartridge body 2, whereby the tape cartridge 31 is completed.

Figure 16:
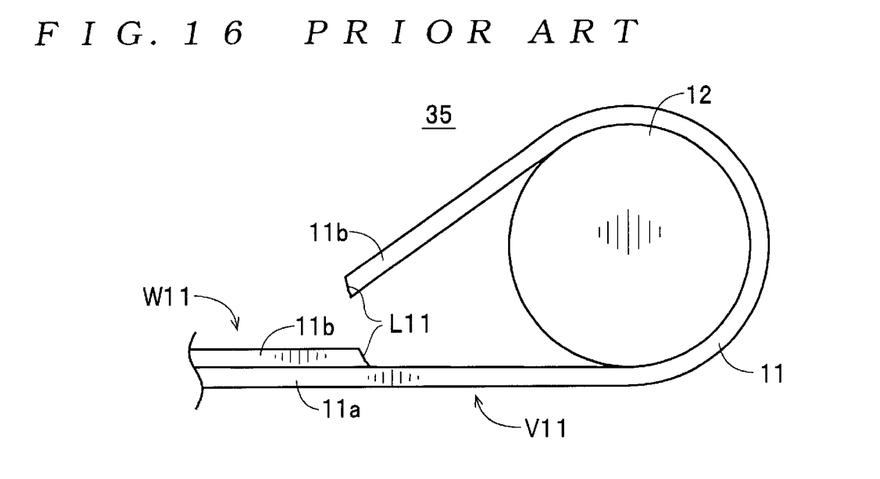
FIG. 16 is a side view of the leader tape 35 in a state broken at the boundary line L11.

However, the conventional leader tape 35 suffers from the following problems: The boundary line L11 dividing between the welded area W11 and the non-welded area V11 is in the form of a straight line perpendicular to the direction of the length of the tape body 11. Therefore, when the pin 12 is pulled via the hooks 13, 13 in a direction indicated by an arrow C1 in FIG. 15 to pull out the magnetic tape 4, stress is concentrated on a portion of the tape body 11 which is very short with respect to the direction of the length of the tape (portion of the boundary line L11). This can cause breakage of the leading end portion 11b along the boundary line L11 or in the vicinity thereof, as shown in FIG. 16.

Figure 17A:
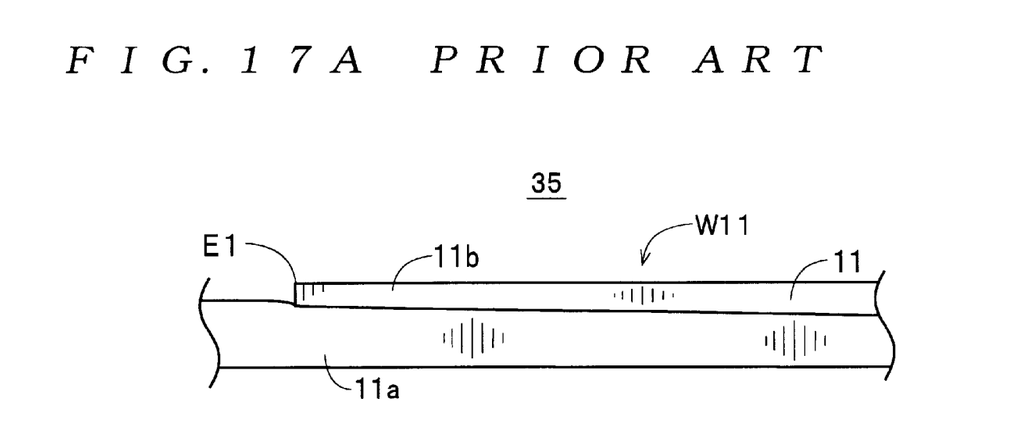
FIG. 17A is side view of an edge E1 side portion of the welded area W11 of the leader tape 35.
Figure 17B:
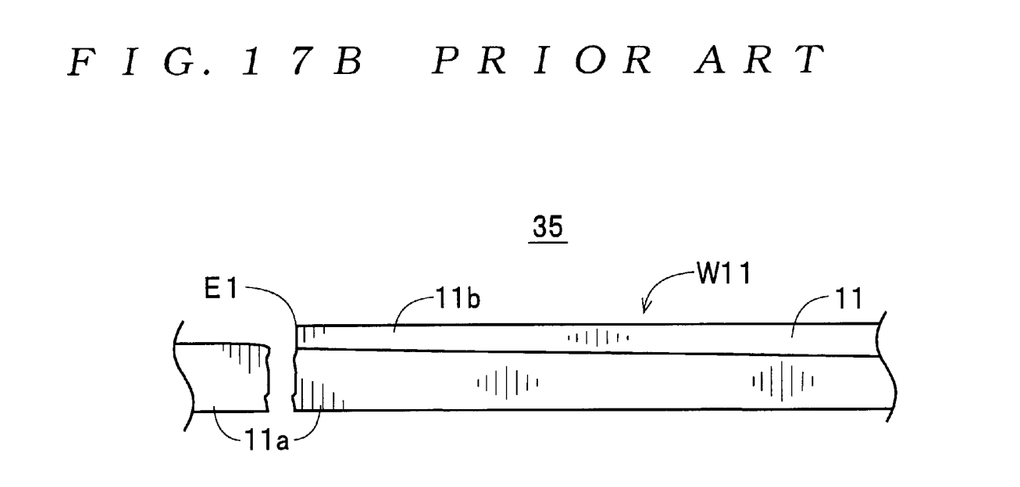
FIG. 17B is a side view of the leader tape 35 in a state broken in the vicinity of the edge E1.

Further, in the conventional leader tape 35, as shown in FIG. 17A, the leading end portion 11b and the root portion 11a are welded to each other all over the area between the boundary line L11 (not shown in this figure) and the edge E1 to cause the leading end portion 11b and the root portion 11a to be substantially completely integrated with each other in the welded area W11, through solidifying, after being melted to each other, so that the thickness of the tape body 11 (root portion 11a) undergoes a sudden change at the edge E1. Therefore, when the pin 12 is pulled in the direction of an arrow C2 in FIG. 15, stress is also concentrated on the portion of this edge E1. This may cause breakage of the root portion 11a at the edge E1 or in the vicinity thereof, as shown in FIG. 17B.

Further, in the conventional leader tape 35, as shown in FIG. 15, the horns X1 each having a pin 12 side corner thereof scarcely chamfered (e.g. horns X11 each having the corner whose cross-sectional shape is in the form of arc having a radius of 0.1 mm or smaller) are used to effect the welding, and therefore, stress is concentrated on a portion along the boundary line L11. As a result, the residual stress itself of the portion along the boundary line L11 becomes large. This can also cause breakage of the leading portion 11b at the boundary line L11 or in its vicinity, as shown in FIG. 16, when the pulling-out of the magnetic tape 4 is repeatedly carried out. Further, the welding with each horns X1 having the corner thereof scarcely chamfered forms a juncture of the leading end portion 11b between the welded area W11 and the non-welded area V11, in a manner corresponding to the corner of horn X11. Therefore, when the pin 12 is pulled in the direction indicated by the arrow C2 in FIG. 15 to forcibly expand a juncture angle θ formed between the welded area W11 and the non-welded area V11, stress is concentrated at the very narrow boundary line L11, causing breakage at the portion along the boundary line L11.

SUMMARY OF THE INVENTION

It is an object of the invention to provide a leader tape which is capable of preventing breakage thereof when a tape is pulled out by the leader tape, and a tape cartridge incorporating the leader tape.

To attain the above object, according to a first aspect of the invention, there is provided a leader tape including a leader tape body having one end fixed to a tape, for enabling the tape to be pulled out of a cartridge body, and a pin member attached to the leader tape body, for pulling out the tape therewith, the leader tape body having a portion thereof on a side of another end opposite to the one end, the portion being folded such that the folded portion surrounds a periphery of the pin member and that the folded portion has a leading end portion thereof welded to a tape surface of the leader tape body opposed to the folded portion, wherein welding is effected non-densely in at least one of a pin member-side boundary portion of a welded area where the folded leading end portion and the tape surface opposed thereto are welded to each other and a one end-side boundary portion of the welded area.

According to this leader tape, at least one of the pin member-side boundary portion of the welded area where the leading end portion and the tape surface opposed thereto are welded to each other and the one end-side boundary portion of the welded area is non-densely welded. Therefore, the force applied to the leader tape body when the leader tape body is pulled can be distributed over the whole of the boundary portion(s), whereby the breakage of the leader tape body due to the pulling force can be fully prevented.

Preferably, in the at least one of the pin member-side boundary portion and the one end-side boundary portion, welded portions are formed in at least one of a polka-dot pattern, a spotted pattern, and a mesh pattern.

To attain the above object, according to a second aspect of the invention, there is provided a leader tape including a leader tape body having one end fixed to a tape, for enabling the tape to be pulled out of a cartridge body, and a pin member attached to the leader tape body, for pulling out the tape therewith, the leader tape body having a portion thereof on a side of another end opposite to the one end, the portion being folded such that the folded portion surrounds a periphery of the pin member and that the folded portion has a leading end portion thereof welded to a tape surface of the leader tape body opposed to the folded portion, wherein welding of the folded leading end portion is effected such that at least one of a pin member-side boundary portion of a welded area where the folded leading end portion and the tape surface opposed thereto are welded to each other and a one end-side boundary portion of the welded area forms an arcuate shape in cross-section along a tape length, the arcuate shape protruding toward the tape surface opposed thereto.

According to this preferred embodiment, welding of the leader tape body is effected such that the pin member-side boundary portion of the folded portion forms an arcuate shape in cross-section along the direction of a tape length, the arcuate shape protruding toward the tape surface opposed thereto. Therefore, even when a juncture angle formed between the welded area of the leading end portion and a non-welded area extending from the welded area toward the pin member is forcedly expanded, stress is not concentrated at one point but distributed over the whole boundary portion welded to form the arcuate cross-sectional shape. This makes it possible to increase the strength of the tape body against the pulling force, so that breakage at the leading end portion thereof can be positively prevented. Further, to effect the welding such that the boundary portion forms the arcuate cross-sectional shape, a horn having a corner whose cross-sectional shape is arcuate is used, so that stress applied to a pin member-side boundary portion of the welded area during the welding is distributed whereby the residual stress at the folded leading end portion can be reduced. This makes it possible to increase the strength against the pulling force, so that breakage of the leader tape body can be positively prevented.

More preferably, the arcuate shape has a radius not smaller than 0.3 mm and not larger than 1.0 mm.

According to this preferred embodiment, the arcuate shape has a radius not smaller than 0.3 mm and not larger than 1.0 mm. Therefore, it is possible to positively prevent breakage of the leader tape body due to the pulling force, while preventing the pin member from falling off.

To attain the above object, according to a third aspect of the invention, there is provided a leader tape including a leader tape body having one end fixed to a tape, for enabling the tape to be pulled out of a cartridge body, and a pin member attached to the leader tape body, for pulling out the tape therewith, the leader tape body having a portion thereof on a side of another end opposite to the one end, the portion being folded such that the folded portion surrounds a periphery of the pin member and that the folded portion has a leading end portion thereof welded to a tape surface of the leader tape body opposed to the folded portion, wherein welding of the leader tape body is effected such that at least one of a pin member-side boundary of a welded area where the folded leading end portion and the tape surface opposed thereto are welded to each other and a one end-side boundary of the welded area forms a protruded shape having a central portion thereof protruded toward the pin member or a recessed shape having a central portion thereof recessed in a direction away from the pin member.

According to this leader tape, welding of the leader tape body is effected such that at least one of the pin member-side boundary of the welded area where the leading end portion and the tape surface opposed thereto are welded to each other and the one end-side boundary of the welded area forms a protruded shape having a central portion thereof protruded toward the pin member or a recessed shape having a central portion thereof recessed in a direction away from the pin member. Therefore, the force applied when the leader tape body is pulled can be distributed over a wider area due to the increased length of the boundary line than when the boundary or boundaries of the welded area are each in the form of a straight line perpendicular to the direction of the length of the tape. This makes it possible to fully prevent the breakage of the leader tape body due to the pulling force. Further, if a welding tool, such as an ultrasonic horn, is used for performing the welding such that the boundary line forms a protruded or recessed shape, the welding tool can be configured to have a simple shape while preserving the effects of prevention of breakage of the leader tape body.

To attain the above object, according to a fourth aspect of the invention, there is provided a tape cartridge comprising a cartridge body, a tape, a leader tape fixedly attached to the tape, the leader tape including a leader tape body having one end fixed to the tape, for enabling the tape to be pulled out of a cartridge body, and a pin member attached to the leader tape body, for pulling out the tape therewith, the leader tape body having a portion thereof on a side of another end opposite to the one end, the portion being folded such that the folded portion surrounds a periphery of the pin member and that the folded portion has a leading end portion thereof welded to a tape surface of the leader tape body opposed to the folded portion, welding being effected non-densely in at least one of a pin member-side boundary portion of a welded area where the folded leading end portion and the tape surface opposed thereto are welded to each other and a one end-side boundary portion of the welded area, and a reel received in the cartridge body, with the tape having the leader tape fixedly attached thereto being wound therearound.

To attain the above object, according to a fifth aspect of the invention, there is provided a tape cartridge comprising a cartridge body, a tape, a leader tape fixedly attached to the tape, the leader tape including a leader tape body having one end fixed to the tape, for enabling the tape to be pulled out of a cartridge body, and a pin member attached to the leader tape body, for pulling out the tape therewith, the leader tape body having a portion thereof on a side of another end opposite to the one end, the portion being folded such that the folded portion surrounds a periphery of the pin member and that the folded portion has a leading end portion thereof welded to a tape surface of the leader tape body opposed to the folded portion, welding of the folded leading end portion being effected such that at least one of a pin member-side boundary portion of a welded area where the folded leading end portion and the tape surface opposed thereto are welded to each other and a one end-side boundary portion of the welded area forms an arcuate shape in cross-section along a tape length, the arcuate shape protruding toward the tape surface opposed thereto, and a reel received in the cartridge body, with the tape having the leader tape fixedly attached thereto being wound therearound.

To attain the above object, according to a sixth aspect of the invention, there is provided a tape cartridge comprising a cartridge body, a tape, a leader tape fixedly attached to the tape, the leader tape including a leader tape body having one end fixed to the tape, for enabling the tape to be pulled out of a cartridge body, and a pin member attached to the leader tape body, for pulling out the tape therewith, the leader tape body having a portion thereof on a side of another end opposite to the one end, the portion being folded such that the folded portion surrounds a periphery of the pin member and that the folded portion has a leading end portion thereof welded to a tape surface of the leader tape body opposed to the folded portion, welding of the leader tape body being effected such that at least one of a pin member-side boundary of a welded area where the folded leading end portion and the tape surface opposed thereto are welded to each other and a one end-side boundary of the welded area forms a protruded shape having a central portion thereof protruded toward the pin member or a recessed shape having a central portion thereof recessed in a direction away from the pin member, and a reel received in the cartridge body, with the tape having the leader tape fixedly attached thereto being wound therearound.

According to these tape cartridges, the force applied to the leader tape body when the leader tape is pulled can be distributed over a wide range of area, such as the whole area of the boundary portion(s). Therefore, it is possible to fully prevent the breakage of the leader tape body due to the pulling force. This improves the durability of the tape cartridge.

It should be noted that the disclosure of the present specification relates to the subjects included in Japanese Patent Application No. 2001-128518 which was filed with Japanese Patent Office on Apr. 26, 2001, and all of the disclosures thereby are expressly incorporated herein by reference.

BRIEF DESCRIPTION OF THE DRAWINGS

These and other objects and features of the present invention will be explained in more detail below with reference to the attached drawings, wherein:

FIG. 2B is a schematic view useful for explaining a welded state of the leader tape 5 welded between a leading end portion 11b and a root portion 11a;

FIG. 8A is a perspective view of the appearance of a horn X2 used in making the leader tape 15a;

FIG. 9A is a plan view of a welded area W2 and its vicinity of the leader tape 15a;

DESCRIPTION OF THE PREFERRED EMBODIMENTS

The invention will now be described with reference to drawings showing preferred embodiments of the invention. It should be noted that the component parts and elements identical to those of the conventional tape cartridge 31 and leader tape 35 are designated by identical reference numerals and detailed description thereof will be omitted.

First, the construction of a tape cartridge 1 using a leader tape will be described with reference to FIG. 11.

The tape cartridge 1 is a one reel-type recording medium cartridge which contains a magnetic tape 4 for use as a backup medium for recording data recorded in a main recording medium of a computer, and is comprised of a cartridge body 2, a reel 3, a magnetic tape 4 and a leader tape 5, as shown in FIG. 11. The magnetic tape 4 (see FIG. 1) is actually wound around the reel 3, but in FIG. 11, the illustration of the magnetic tape is omitted. The cartridge body 2 is comprised of an upper half 2a and a lower half 2b which are each formed to have a tray shape and can be fitted to each other, and a shutter member 2c which can cover a tape-pulling slot defined by the upper half 2a and the lower half 2b in the state fitted to each other. The reel 3 is comprised of an upper flange 3a integrally formed with a hub for having the magnetic tape 4 wound therearound, and a lower flange 3b welded to the hub.

Figure 1:
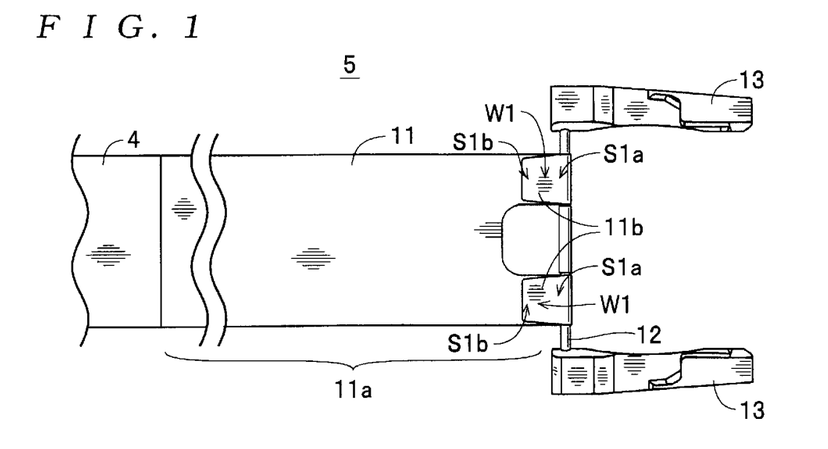
FIG. 1 is a plan view of a leader tape 5 according to one embodiment of the invention.

The leader tape 5 is for pulling the magnetic tape 4 out of the cartridge body 2 containing the same in a state wound around the reel 3, and as shown in FIG. 1, the leader tape 5 includes a tape body (leader tape body) 11, a pin(pin member) 12, and hooks 13, 13. At one end of the tape body 11 on a side where the pin 12 is attached, there are formed leading end portions 11b, 11b in a manner bifurcated from the one end, as shown in FIG. 12A, for being welded to the root portion 11a. Further, the tape body 11 is formed such that the thickness thereof is progressively reduced from the root portion 11a through the leading end portions 11b. In this case, the thickness T1 of the root portion 11a is set to about 190 µm, and that of the leading end portions 11b (in the vicinity of its edge E1) to about 100 µm. Further, as shown in FIG. 1, the leading end portions 11b of the tape body 11 are folded along the periphery of the pin 12 and welded to the root portion 11a whereby the pin 12 is attached to the tape body 11.

Next, a method of making the leader tape 5 and using of the same will be described with reference to drawings.

Figure 2A:
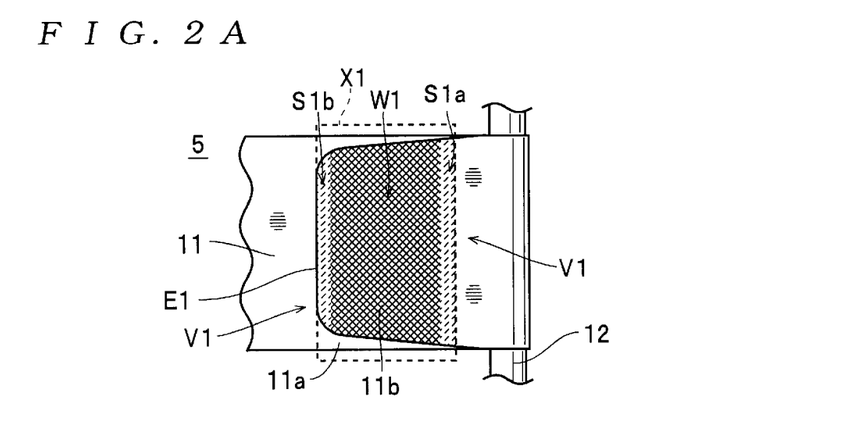
FIG. 2A is a plan view of a portion of the leader tape 5 of a welded area W11 and its vicinity.
Figure 3:
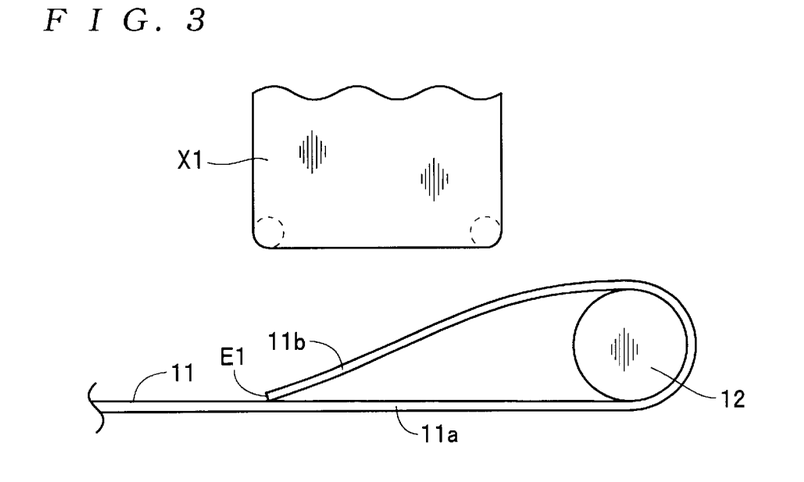
FIG. 3 is an explanatory view useful in explaining a method of making the leader tape 5.

When the leader tape 5 is made, a horn X1 part of which is shown in FIG. 3 is used for welding the leading end portion 11b to the root portion 11a. A portion of the horn X1 for being brought into contact with the leading end portion 11b has a width slightly larger than the lateral width of the leading end portion 11b, as shown in FIG. 2A, and a corner opposed to the edge E1 of the tape body 11 and a corner opposed to the pin 12 are each chamfered into an arcuate shape having a radius of about 0.5 mm, as shown in FIG. 3. Further, the horn X1 has knurls (not shown) formed on a welding surface (abutment surface via which the horn X11 abuts on the corresponding leading end portion 11b) thereof at a pitch of about 0.6 mm. In the chamfered corners, therefore, knurls are formed such that the tops thereof are progressively receded with respect to a plane on which the tops of knurls on a central area of the bottom of the horn X11 are arranged in rows.

Figure 4A:
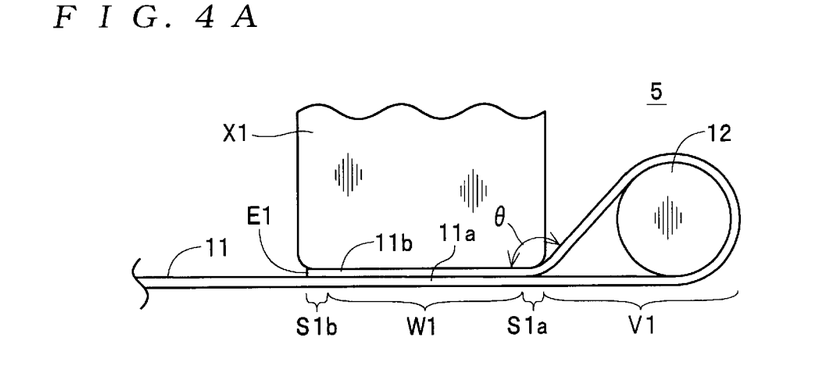
FIG. 4A is a side view of a portion of the leader tape 5 along the length thereof where the leading end portion 11b is welded to the root portion 11a by a horn X1.

In welding, first, as shown in FIG. 3, the leading end portion 11b of the tape body 11 is brought into contact with the root 11a such that the leading end portion 11b of the tape body 11 surrounds the periphery of the pin 12. Then, as shown in FIG. 4A, the horn X1 is brought into contact with the surface of the leading end portion 11b, and ultrasonic waves are delivered from the horn X1 with the leading end portion 11b urged against the root portion 11a. By this process, the leading end portion 11b and the root portion 11a have their contact surfaces melted and mixed to each other, and the mixed portion solidifies when it cools to normal temperature. This causes the leading end portion 11b and the root portion 11a to be integrated with each other, whereby the attachment of the pin 12 to the tape body 11 is completed. After this, the leader tape 5 is fixedly attached to the leading end of the magnetic tape 4, the magnetic tape 4 is wound around the reel 3, and then the resulting assembly is received in the cartridge body 2, whereby the tape cartridge 1 is completed.

Figure 2B:
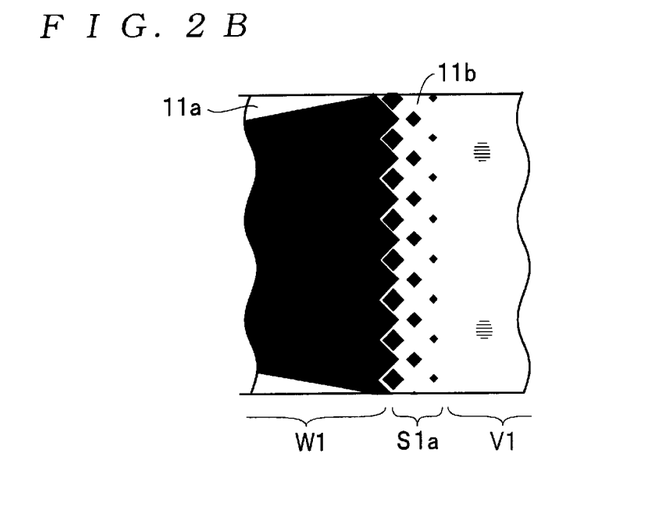
Figure 4B:
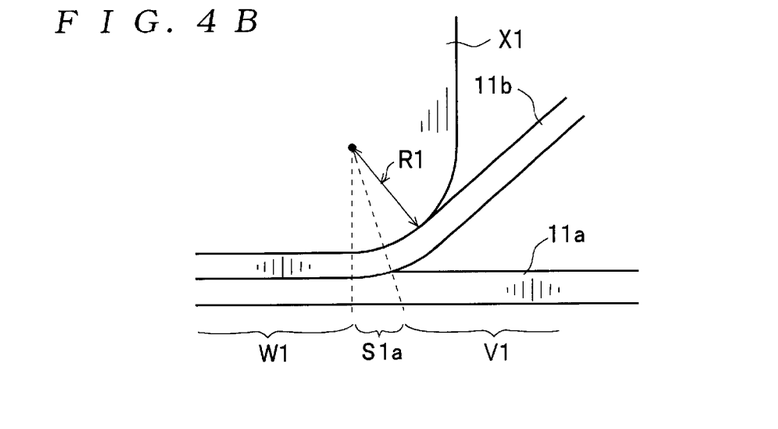
FIG. 4B is an enlarged view of a boundary portion S1b appearing in FIG. 4A.
Figure 5A:
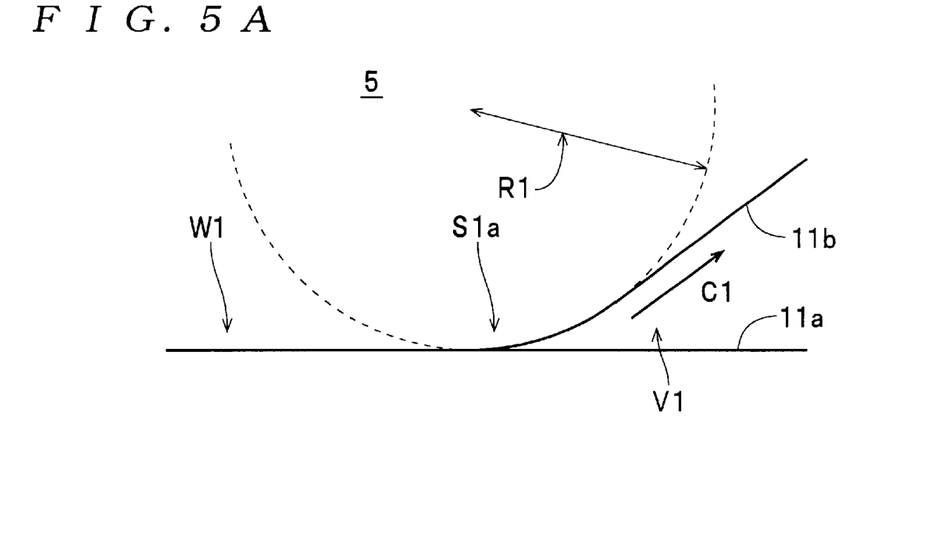
FIG. 5A is an explanatory view which is useful in explaining a configuration of a boundary portion S1a and its vicinity of the leader tape 5 according to the embodiment.

In the leader tape 5 according to the present embodiment, since both the corners of the horn X1 are chamfered such that they form an arcuate shape in cross-section, welding is effected in portions (boundary portions S1a and S1b, referred to hereinafter) of each leading end portion 11b opposed to the respective corners of the horn X1 such that the opposed portions each form an arcuate shape in cross-section along the length of the tape, as shown in FIG. 4B. More specifically, the opposed portion forms the boundary portions S1a between a welded area W1 where the leading end portion 11b and the root portion 11a are completely welded to each other and a non-welded area V1 where the leading portion 11b and the root portion 11a are completely separate from each other. In this case, at the boundary portion S1a toward the pin 12, as shown in FIGS. 4B, 5A, the leading end portion 11b generally progressively comes apart from the root portion 11a toward the pin 12 along an arcuate path protruding toward the tape surface of the opposed root portion 11a and having a radius R1 of about 0.6 mm to 0.8 mm, which is slightly larger than the radius 0.5 mm of the arcuate shape of the corners of the horn X1. However, portions of the boundary portion S1a of the leading end portion 11b corresponding to the respective tops of knurls formed on the horn X1 are brought into abutment with the surface of the root portion 11a in a state protruded toward the root portion 11a by these tops of the knurls. Further, the degree of abutment or contact between the portions of the boundary portion S1a of the leading end portion 11b corresponding to the respective tops of the knurls and the surface of the root portion 11a becomes smaller as the contact point becomes closer to the non-welded area V1. Therefore, in this leader tape 5, as shown in FIG. 2B, welding is effected in the boundary portion S1a of the leader tape 5 non-densely such that welded portions of the leading end portion 11b and the root portion 11a are formed in a polka-dot pattern by the knurls formed on the both corners of the horn X1. More specifically, in the boundary portion S1a, although the leading end portion 11b and the root portion 11a are welded non-densely, as the location comes closer to the welded area W11, they are welded a little more densely (welded such that dots of the polka-dot pattern are separate from each other, and at the same time larger in size), and as the location comes closer to the pin 12, they are welded a little more non-densely (welded such that dots of the polka-dot patter are separate from each other, and at the same time smaller in size). Further, in the welded area W1, since the tops of knurls are uniformly urged against the leading end portion 11b, so that the leading end portion 11b and the root portion 11a are welded densely almost all over the area in a polka-dot pattern such that dots of the polka-dot pattern are connected to each other.

Figure 5B:
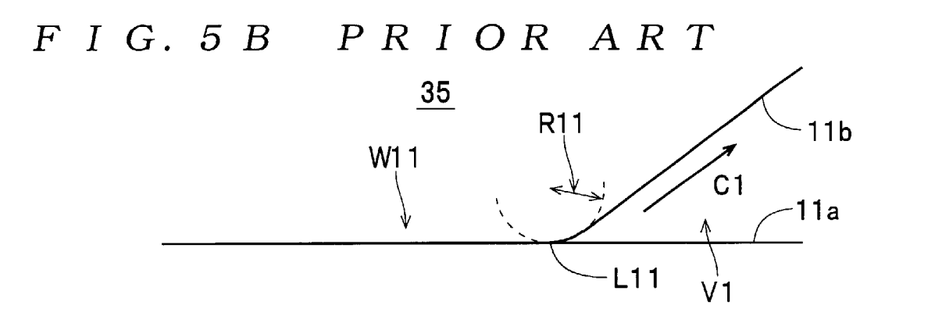
FIG. 5B is an explanatory view which is useful in explaining a configuration of a boundary line L11 and its vicinity of a conventional leader tape 35.

Therefore, in the leader tape 5, when the pin 12 is pulled via the hooks 13, 13, the force applied to the leading end portion 11b in the direction of the arrow C1 in FIGS. 5A, 5B is distributed in a relatively wide range of area along the tape length of the boundary portion S1a where the welding is effected non-densely. This prevents the applied force from acting in a manner concentrated on a particular portion, whereby differently from the conventional leader tape 35, the breakage of the leading end portion 11b due to the pulling force can be prevented. Further, since the welding is effected by using the horn X1 having the corners chamfered to form an arcuate shape, in cross-section, which has a radius of 0.5 mm, whereby the cross-section of the boundary portion S1a of the leading end portion 11b has an arcuate shape having a slightly increased radius. This makes it possible to prevent stress from being concentrated at the boundary portion S1a. Therefore, the residual stress itself in the boundary portion S1a of the leading end portion 11b can be reduced. As a result, it is possible to effectively prevent the leading end portion 11b from being broken at the boundary portion S1a. Further, the welding is effected such that the cross-section along the length of the tape in the boundary portion S1a toward the pin 12 has the arcuate shape protruding toward the opposed tape surface. Therefore, even when the pin 12 is pulled to thereby forcibly expand the juncture angle θ (see FIG. 4A) formed between the welded area of the leading end portion and a non-welded area extending from the welded area toward the pin member 12, stress is not concentrated at one point differently from the prior art but distributed over the whole boundary portion S1a welded to form the arcuate cross-sectional shape. This makes it possible to increase the strength of the tape body against the pulling force, so that breakage at the leading end portion 11b can be positively prevented.

In contrast, in the conventional leader tape 35 using a conventional horn having a flat welding surface including surfaces of corners, as shown in FIG. 5B, a portion of the leading end portion 11b corresponding to a corner of the horn comes apart from the root portion 11a toward the pin 12 along an arcuate path having a radius R11 of about 0.1 mm due to resilience of the tape body 11 itself. However, the conventional horn has the knurls formed on the flat welding surface, so that all the tops of the knurls are uniformly urged against the leading end portion 11b. This causes the welded area to be formed substantially entirely densely in a polka-dot pattern such that dots of the polka-dot pattern are connected to each other. As a result, in the conventional leader tape 35, the welded area W11 where the leading end portion 11b and the root portion 11a are completely welded and the non-welded portion where the leading end portion 11b and the root portion 11a are completely separate from each other are divided by the boundary line L11 which is perpendicular to the direction of the length of the tape body 11 and in the form of a straight line. Therefore, as described hereinabove, when the pin 12 is pulled, stress is concentrated at the boundary line L11 in the form of a straight line, so that the leading end portion 11b can be broken due to the pulling force. In this case, according to results of experiments conducted by the present inventor, the breakage of the leading end portion 11b can be fully prevented by welding the leading end portion 11b and the root portion 11a to each other such that the leading end portion 11b at the boundary portion S1a comes apart from the root portion 11a along an arcuate path having a radius not smaller than 0.3 mm and not larger than 1.0 mm. Further, it is also confirmed that when the welding is effected such that the arcuate path has a radius of less than 0.3 mm, the leading end portion 11b is liable to breakage similarly to the conventional leader tape 35. Further, it is also confirmed that when the welding is effected such that the arcuate path has a radius of more than 1.0 mm, the welding is not effected sufficiently in the boundary portion S1a, so that the pin 12 is liable to fall off. Therefore, a leader tape can be made which is capable of fully preventing the breakage due to the pulling force and the falling-off of the pin 12, by welding the leading end portion 11b and the root portion 11a to each other such that the cross-section of the boundary portion S1a (or portion from the boundary portion S1a to the non-welded area V1) forms an arcuate path having a radius not smaller than 0.3 mm and not larger than 1.0 mm.

Figure 6:
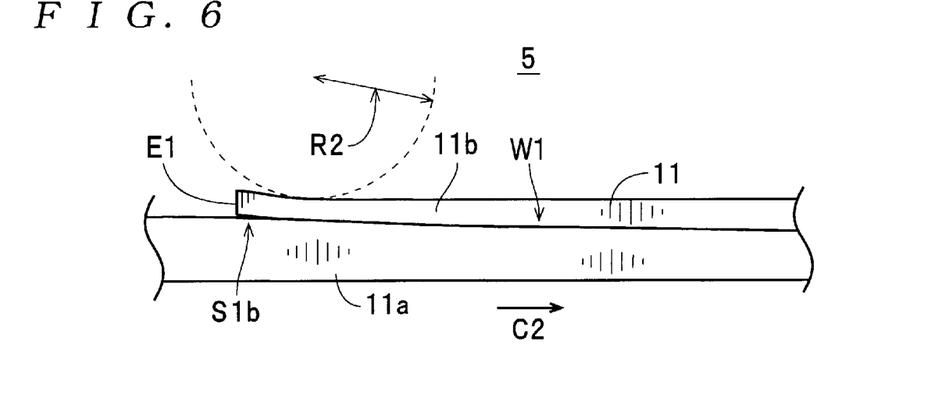
FIG. 6 is a side view of the boundary portion S1b and its vicinity of the leader tape 5.

Further, as described hereinbefore, in the leader tape 5, the corner of the horn X1 opposed to the edge E1 is chamfered into an arcuate shape in cross-section similarly to the other corner of the same toward the pin 12. Therefore, as shown in FIG. 6, the leading end portion 11b and the root portion 11a are welded such that the cross-section of a portion of the leading end portion 11b on the side of the edge E11 has a shape forming an arcuate path protruding toward the tape surface of the root portions 11a. More specifically, the welding is carried out such that the portion of the leading end portion 11b on the side of the edge E1 forms an arcuate path to the edge E1 which has a radius R2 of about 0.8 mm. Therefore, according to this leader tape 5, in the boundary portion S1b between the welded area W1 and the edge E1, the welding is performed non-densely similarly to the boundary portion S1a. In the boundary portion S1b, similarly to the boundary portion S1a, since the corners of the horn X1 are chamfered, during the welding process, the tape surface of the boundary portion S1b and the tops of the knurls are progressively or increasingly separated, as the location comes closer to the edge E1. Therefore, in the boundary portion S1b, although the leading end portion 11b and the root portion 11a are welded non-densely, as the location comes closer to the welded area W1, they are welded a little more densely, (welded such that the dots of the polka-dot pattern are separate from each other, and at the same time larger in size), while as the location comes closer to the edge E1, they are welded more non-densely (welded such that the dots of the polka-dot pattern are separate from each other, and at the same time smaller in size). Therefore, in the leader tape 5, when the pin 12 is pulled, the stress applied to the root portion 11a is distributed in a somewhat wider range of area along the direction of tape length, i.e. the boundary portion S1b where the welding is effected non-densely. This prevents the stress from being concentrated at a particular portion, whereby differently from the conventional leader tape 35, the breakage of the root portion 11a due to the pulling force can be prevented. In the boundary portion S1b, similarly to the boundary portion S1a, since the corners of the horn X1 are chamfered, it is possible to prevent stress from being concentrated at the boundary portion S1b during the welding process. Therefore, the residual stress itself in the boundary area S1b of the edge E1 can be reduced. As a result, it is possible to effectively prevent the root portion 11a from being broken at the edge E1.

Next, leader tapes 15a, 15b according to other embodiments of the invention will be described with reference to drawings.

Figure 7:
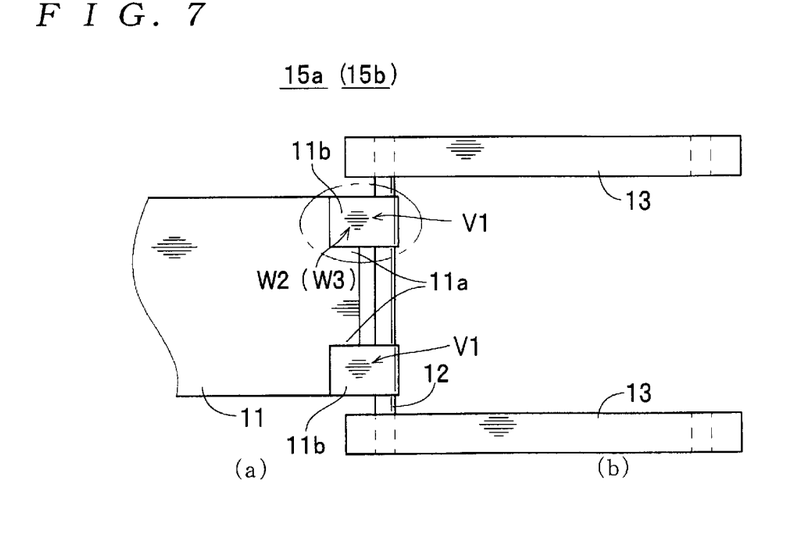
FIG. 7 is a plan view of a leader tape 15a (15b) according to other embodiments of the invention.
Figure 8A:
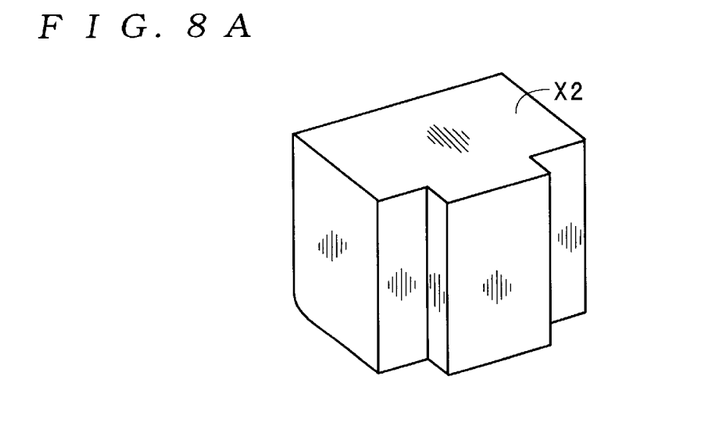
Figure 8B:
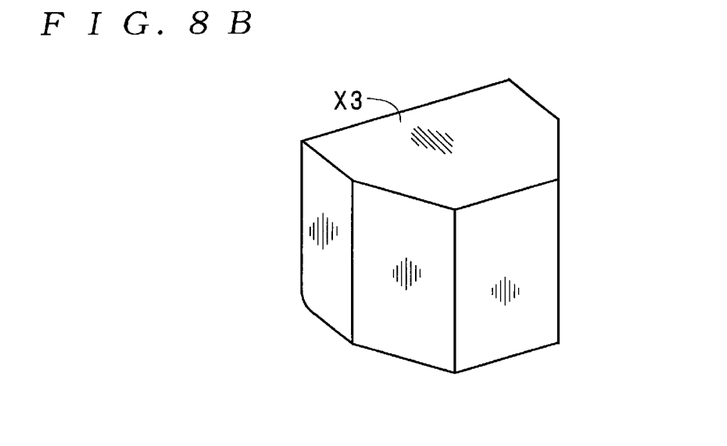
FIG. 8B is a perspective view of the appearance of a horn X3 used in making the leader tape 15b.

FIG. 7 shows the leader tape 15a (or 15b) with which the magnetic tape 4 is pulled out of the cartridge body 2 similarly to the leader tape 5, and the leader tape 15a (15b) includes a tape body 11, a pin 12, and hooks 13, 13. The leader tape 15a (15b) is made by using a horn X2 (or X3) shown in FIG. 8A (or 8B) when the welding of the leading end portion 11b and the root portion 11a is carried out. The horn X2 (or X3) is protruded in plan view (welding surface has a protruded shape in plan view), and a corner of the horn X2 (or X3) opposed to the edge E1 of the tape body 11 is chamfered into an arcuate shape similarly to that of the horn X1. In this leader tape 15a (or 15b), by using the horn X2 (or X3), a welded area W2 (or W3) where the leading end portion 11b and the root portion 11a are completely welded to each other and a non-welded area V1 where the leading end portion 11b and the root portion 11a are completely separate from each other are divided by a protruded boundary line.

Figure 9A:
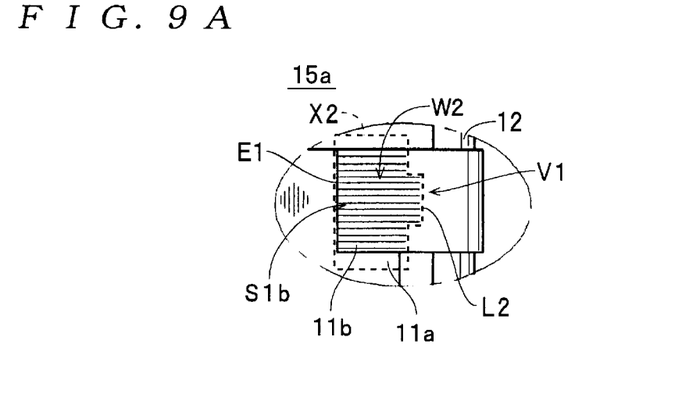
Figure 9B:
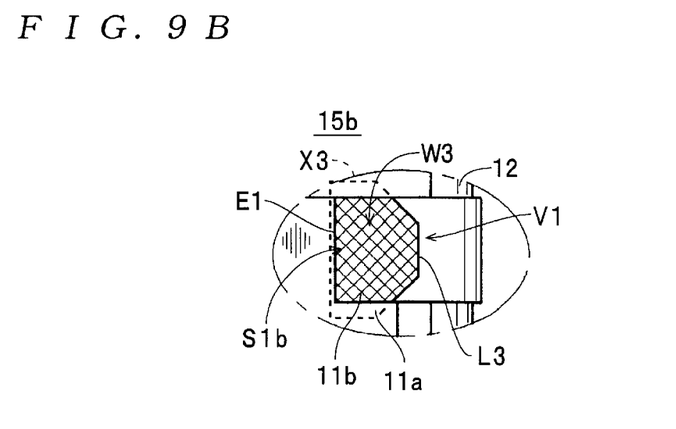
FIG. 9B is a plan view of a welded area W3 and its vicinity of the leader tape 15b.

More specifically, as shown in FIG. 9A (or 9B), in the leader tape 15a (or 15b), the leading end portion 11b and the root portion 11a are welded to each other such that the boundary line L2 (or L3) dividing between the welded area W2 (or W3) and the non-welded area V1 is protruded in a central portion thereof toward the pin 12. Therefore, in the leader tape 15a (or 15b), the length of the boundary line L2 (or L3) becomes longer than the boundary line L1 which is in the form of a straight line perpendicular to the direction of the length of the tape, so that the force applied to the leading end portion 11b to pull out the magnetic tape 4 is distributed to a wider range of area by the increased boundary line. This sufficiently prevents the breakage of the root portion 11a due to the pulling force, similarly to the leader tape 5. Further, in potions of the leader tapes 15a, 15b close to the edge E1, the welding is effected in the same manner as effected in the boundary portion S1b of the leader tape 5, and hence the description thereof is omitted.

Figure 10:
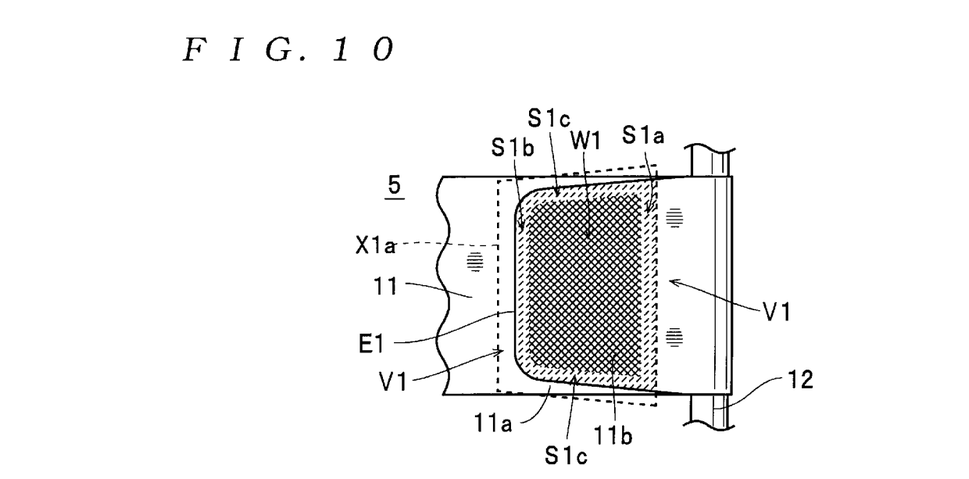
FIG. 10 is a plan view of a welded area W1 and its vicinity of the leader tape 5 formed by another welding method.

It should be noted that the present invention is not limited to the above embodiments, but the construction thereof can be modified as required. For instance, although in the leader tape 5 according to the first embodiment of the invention, the horn X1 having both of the corners opposed to the edge E1 and the corner toward the pin 12 are chamfered is used for welding, this is not limitative, but a horn having either of the corners chamfered into the arcuate shape may be used for welding. Further, by chamfering the whole periphery of the welding surface of the horn X1a, as shown in FIG. 10, the welding may be effected non-densely in boundary portions S1c, S1c between the lateral side edges of the leading end portion 11b and the root portion 11a. That is, there may be provided the boundary portions S1a, S1b, S1c, S1c on all the boundary areas between the non-welded area V1 and the welded area W1. When this construction is employed, it is possible to further increase the strength of the leader tape 5 against the breakage thereof.

Further, although as to the leader tapes 15a, 15b, the description was given of the example using the horns X2, X3 which are protruded in plan view, it is also possible to use a horn which is recessed in plan view to thereby form a boundary between the welded area W1 and the non-welded area V1 such that the boundary is recessed on a side facing toward the pin 12. This configuration can also increase the strength of the leader tape 5 against breakage. Further, it is possible to employ a horn which can form one of the boundary opposed to the edge E1 and the boundary toward the pin 12 in a recessed manner and the other in a protruded manner. It should be noted that the configuration of the horn may be defined such that the boundary line of the welded area W1 has any of various non-linear shapes, including shapes of a polygonal line, a curve, and a wavy line. In this case, theoretically, so long as the length of the boundary line is made larger than the tape width of the tape body 11, the strength of the resulting leader tape against breakage can be increased thereby. Further, the object to which the present leader tape is attached is not limited to the magnetic tape for data recording, but it may be any of various tapes, including a cleaning tape. In addition, the method of welding the leading end portion 11b and the root portion 11a to each other is not limited to the method using the ultrasonic waves, but it is possible to employ a welding tool using heat generated by a heater.

What is claimed is:

1. A leader tape including a leader tape body having one end fixed to a tape, for enabling the tape to be pulled out of a cartridge body, and a pin member attached to the leader tape body, for pulling out the tape therewith, the leader tape body having a portion thereof on a side of another end opposite to the one end, the portion being folded such that the folded portion surrounds a periphery of the pin member and that the folded portion has a leading end portion thereof welded to a tape surface of the leader tape body opposed to the folded portion, wherein welding is effected non-densely in at least one of a pin member-side boundary portion of a welded area where the folded leading end portion and the tape surface opposed thereto are welded to each other and a one end-side boundary portion of the welded area.

2. A leader tape according to claim 1, wherein in the at least one of the pin member-side boundary portion and the one end-side boundary portion, welded portions are formed in at least one of a polka-dot pattern, a spotted pattern, and a mesh pattern.

3. A leader tape including a leader tape body having one end fixed to a tape, for enabling the tape to be pulled out of a cartridge body, and a pin member attached to the leader tape body, for pulling out the tape therewith, the leader tape body having a portion thereof on a side of another end opposite to the one end, the portion being folded such that the folded portion surrounds a periphery of the pin member and that the folded portion has a leading end portion thereof welded to a tape surface of the leader tape body opposed to the folded portion, wherein welding of the folded leading end portion is effected such that at least one of a pin member-side boundary portion of a welded area where the folded leading end portion and the tape surface opposed thereto are welded to each other and a one end-side boundary portion of the welded area forms an arcuate shape in cross-section along a tape length, the arcuate shape protruding toward the tape surface opposed thereto.

4. A leader tape according to claim 3, wherein the arcuate shape has a radius not smaller than 0.3 mm and not larger than 1.0 mm.

5. A leader tape including a leader tape body having one end fixed to a tape, for enabling the tape to be pulled out of a cartridge body, and a pin member attached to the leader tape body, for pulling out the tape therewith, the leader tape body having a portion thereof on a side of another end opposite to the one end, the portion being folded such that the folded portion surrounds a periphery of the pin member and that the folded portion has a leading end portion thereof welded to a tape surface of the leader tape body opposed to the folded portion, wherein welding of the leader tape body is effected such that at least one of a pin member-side boundary of a welded area where the folded leading end portion and the tape surface opposed thereto are welded to each other and a one end-side boundary of the welded area forms a protruded shape having a central portion thereof protruded toward the pin member or a recessed shape having a central portion thereof recessed in a direction away from the pin member.

6. A tape cartridge comprising:

a cartridge body;

a tape;

a leader tape fixedly attached to said tape, said leader tape including a leader tape body having one end fixed to said tape, for enabling the tape to be pulled out of a cartridge body, and a pin member attached to said leader tape body, for pulling out said tape therewith, said leader tape body having a portion thereof on a side of another end opposite to the one end, the portion being folded such that the folded portion surrounds a periphery of said pin member and that the folded portion has a leading end portion thereof welded to a tape surface of said leader tape body opposed to the folded portion, welding being effected non-densely in at least one of a pin member-side boundary portion of a welded area where the folded leading end portion and the tape surface opposed thereto are welded to each other and a one end-side boundary portion of the welded area; and a reel received in said cartridge body, with said tape having said leader tape fixedly attached thereto being wound therearound.

7. A tape cartridge according to claim 6, wherein in the at least one of the pin member-side boundary portion and the one end-side boundary portion of the welded area, welded portions are formed in at least one of a polka-dot pattern, a spotted pattern, and a mesh pattern.

8. A tape cartridge comprising:

a cartridge body;

a tape;

a leader tape fixedly attached to said tape, said leader tape including a leader tape body having one end fixed to said tape, for enabling the tape to be pulled out of a cartridge body, and a pin member attached to said leader tape body, for pulling out said tape therewith, said leader tape body having a portion thereof on a side of another end opposite to the one end, the portion being folded such that the folded portion surrounds a periphery of said pin member and that the folded portion has a leading end portion thereof welded to a tape surface of said leader tape body opposed to the folded portion, welding of the folded leading end portion being effected such that at least one of a pin member-side boundary portion of a welded area where the folded leading end portion and the tape surface opposed thereto are welded to each other and a one end-side boundary portion of the welded area forms an arcuate shape in cross-section along a tape length, the arcuate shape protruding toward the tape surface opposed thereto; and a reel received in said cartridge body, with said tape having said leader tape fixedly attached thereto being wound therearound.

9. A leader tape according to claim 8, wherein the arcuate shape has a radius not smaller than 0.3 mm and not larger than 1.0 mm.

10. A tape cartridge comprising:

a cartridge body;

a tape;

a leader tape fixedly attached to said tape, said leader tape including a leader tape body having one end fixed to said tape, for enabling said tape to be pulled out of a cartridge body, and a pin member attached to said leader tape body, for pulling out said tape therewith, said leader tape body having a portion thereof on a side of another end opposite to the one end, the portion being folded such that the folded portion surrounds a periphery of said pin member and that the folded portion has a leading end portion thereof welded to a tape surface of said leader tape body opposed to the folded portion, welding of said leader tape body being effected such that at least one of a pin member-side boundary of a welded area where the folded leading end portion and the tape surface opposed thereto are welded to each other and a one end-side boundary of the welded area forms a protruded shape having a central portion thereof protruded toward said pin member or a recessed shape having a central portion thereof recessed in a direction away from said pin member; and a reel received in said cartridge body, with said tape having said leader tape fixedly attached thereto being wound therearound.

* * * * *